A. H. SMITH.
NIPPLE FOR BOWDEN WIRE MECHANISM AND THE LIKE.
APPLICATION FILED SEPT. 24, 1914.

1,197,073.

Patented Sept. 5, 1916.

Witnesses:

Inventor: Albert Henry Smith
by P. Singer Atty.

UNITED STATES PATENT OFFICE.

ALBERT HENRY SMITH, OF BIRMINGHAM, ENGLAND.

NIPPLE FOR BOWDEN WIRE MECHANISM AND THE LIKE.

1,197,073.

Specification of Letters Patent.

Patented Sept. 5, 1916.

Application filed September 24, 1914. Serial No. 863,381.

*To all whom it may concern:*

Be it known that I, ALBERT HENRY SMITH, a subject of the King of Great Britain, and a resident of Birmingham, in the county of Warwick, England, have invented certain new and useful Improvements in Nipples for Bowden Wire Mechanism and the like; and I do hereby declare that the following is a full, clear, and exact description of the same.

My invention comprises improvements in nipples for Bowden wire mechanism, and refers to that class of such which are designed to provide a mechanical connection with the end of the length of stranded wire, the object of the present invention being to provide an improved and simple arrangement of the kind whereby a connection is established without the use of solder or the like.

It has been proposed to form a rope socket, especially for wire rope, having its main body of sleeve-like form and provided with a tapered plug member, which fits within the end of the wire after the wire has been inserted in the sleeve, in combination with a nut or screwed part, which forces the tapered plug into the end of the wire, thus effecting a mechanical connection between wire and sleeve, by gripping the strands between the tapered face of the plug and the interior of the sleeve.

According to my invention, the plug coöperates with a preferably tapered shoulder between portions of smaller and larger diameter within the sleeve so that the strands of the wire which enter the sleeve approximately parallel to one another, are bent outwardly within the shoulder and again to come more or less parallel within the portion having a larger diameter, this double bend in the strands combined with the gripping action both at and above the shoulder makes the connection extremely secure.

Figure 1:
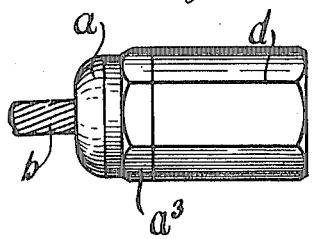
Figure 2:
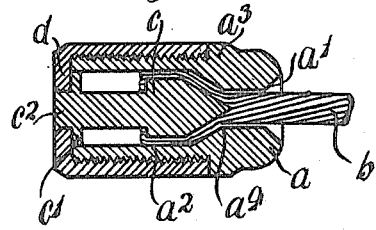
Figure 3:
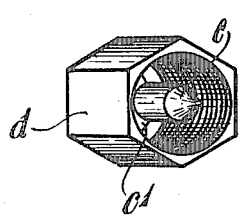
Figure 4:
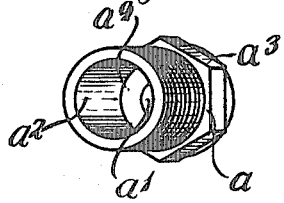
Figure 5:
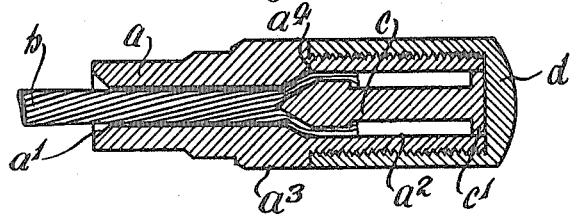
Figure 6:
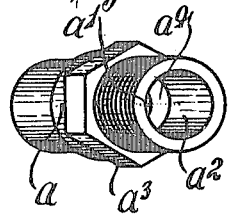
Figure 7:
Figure 8:
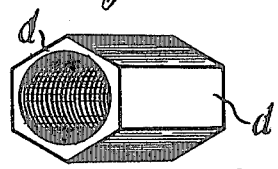

Referring to the drawings:—Figure 1. is an elevation of a nipple according to one form of the invention. Fig. 2. is a longitudinal section of same. Fig. 3. is a perspective view showing the interior end of the internally threaded cap member. Fig. 4. is a similar view of the body member. Fig. 5. is a longitudinal section of a modified form of the invention. Figs. 6, 7 and 8 are perspective views respectively of the body member, plug, and cap according to the modified form of the invention.

In carrying my invention into practice as illustrated upon the accompanying drawings the sleeve $a$ is bored to two diameters, a small diameter $a^1$ at one end corresponding with the diameter of the stranded wire $b$, and a larger diameter $a^2$ at the other end, of such a size that when the plug $c$ is forced into the end of the stranded wire the stranded wire is gripped between the exterior of the plug and the interior of the sleeve. Externally the sleeve is threaded at the end having a larger bore. The middle portion $a^3$ may be conveniently of hexagonal or equivalent shape, whereby it may be held for screwing the parts together, while the other end may be of round or any other shape.

The cap $d$ is internally threaded to engage with the screwed end of the sleeve, and may be conveniently of hexagonal or equivalent shape, so that the cap and sleeve may be tightly screwed together, the interior of the cap being so arranged as to provide the necessary pressure upon the plug for forcing it into the end of the stranded wire.

The junction or shoulder $a^4$ between the two bores within the sleeve is preferably tapered or conical, the one extremity of the plug being of similar form.

As shown in Figs. 1-4 the plug is provided with a shoulder $c^1$ and reduced extremity $c^2$ whereby it is riveted to the cap so that the cap and plug move together all being so arranged that when the stranded wire is inserted into the sleeve and the cap screwed on, the plug is forced into the end of the wire, firmly gripping it against the interior of the sleeve. Or as shown by Figs. 5-8 the plug may be loose within the cap being merely adapted to be pressed into the end of the stranded wire.

What I claim then is:—

1. In nipples for Bowden wire mechanism, the combination of a body member provided with an internal bore having portions of greater and less diameter connected by a tapered portion, a sharp pointed plug within said body member adapted to press the wire strands against the portion of greater diameter and against said tapered portion and coacting with said portions to impart to each of said strands a double flexure, and means for forcing the plug in the body member into operative position, substantially as described.

2. In nipples for Bowden wire mechanism, the combination of a body member having an internal bore terminating in a tapered shoulder, a plug within the body member having a portion parallel to the said internal bore of the body member terminating in a tapered portion parallel to said tapered shoulder, a screw threaded member screwing upon said body member, and a narrow neck connecting said plug to said screw threaded member.

3. In nipples for Bowden wire mechanism, the combination of a body member having an internally tapered portion and straight bore, and an externally screw threaded portion, a cap having a correspondingly internally screw threaded portion, a plug having a base, a narrow neck, a head of less diameter than the straight bore of the body member, and a conical extremity, and means for retaining said plug in a central position within said body member.

In testimony whereof I affix my signature in presence of two witnesses.

ALBERT HENRY SMITH.

Witnesses:
HAROLD J. C. FORRESTER,
J. C. THOMASON.